(12) United States Patent
Godfrey et al.

(10) Patent No.: US 10,801,653 B2
(45) Date of Patent: Oct. 13, 2020

(54) FLEXIBLE, THERMAL-ISOLATING, DUAL-WALLED TUBE WITH BELLOWS AND METHOD FOR MANUFACTURE THEREOF

(71) Applicant: HONEYWELL INTERNATIONAL INC., Morris Plains, NJ (US)

(72) Inventors: Donald G Godfrey, Phoenix, AZ (US); Brian G Baughman, Surprise, AZ (US); Mark McNair, Gilbert, AZ (US); Arden Dennis Hammond, V, Phoenix, AZ (US); Samantha Dugan, Hermosa Beach, CA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 296 days.

(21) Appl. No.: 15/783,039

(22) Filed: Oct. 13, 2017

(65) Prior Publication Data

US 2019/0113163 A1 Apr. 18, 2019

(51) Int. Cl.
| | |
|---|---|
| *F16L 9/18* | (2006.01) |
| *F16L 27/111* | (2006.01) |
| *F16L 51/02* | (2006.01) |
| *F16L 39/04* | (2006.01) |
| *B33Y 80/00* | (2015.01) |
| *B22F 3/24* | (2006.01) |
| *B22F 5/10* | (2006.01) |

(Continued)

(52) U.S. Cl.
CPC .............. *F16L 27/111* (2013.01); *B22F 3/24* (2013.01); *B22F 5/106* (2013.01); *B33Y 80/00* (2014.12); *F01D 25/145* (2013.01); *F01D 25/28* (2013.01); *F02K 1/80* (2013.01); *F16L 39/04* (2013.01); *F16L 51/025* (2013.01); *F16L 51/03* (2013.01); *B22F 3/1055* (2013.01); *B22F 2003/248* (2013.01); *F16F 2230/105* (2013.01)

(58) Field of Classification Search
CPC ......... F16L 27/111; F16L 39/04; F16L 51/025
USPC ................................ 138/121, 122, 114, 148
See application file for complete search history.

(56) References Cited

U.S. PATENT DOCUMENTS

| | | | | |
|---|---|---|---|---|
| 976,610 | A | * | 11/1910 | Schultz ...................... F02B 1/00 123/58.1 |
| 1,218,895 | A | * | 3/1917 | Porter ................... F16L 59/065 138/148 |

(Continued)

FOREIGN PATENT DOCUMENTS

WO 2016013970 A1 1/2016

OTHER PUBLICATIONS

Extended EP Search Report for Application No. 181997503 dated Dec. 19, 2018.

*Primary Examiner* — James F Hook
(74) *Attorney, Agent, or Firm* — Lorenz & Kopf, LLP (57) ABSTRACT

A flexible, thermal-isolating tube includes a first fluid flow channel portion having a dual-walled configuration, a second fluid flow channel portion having a dual-walled configuration, and a bellows disposed between and coupled to each of the first and second fluid flow channel portions. The flexible, thermal-isolating tube, including each of the first and second fluid flow channel portions, and the bellows, is configured as a unitary structure. The flexible, thermal-isolating tube is manufactured using an additive manufacturing process. The flexible, thermal-isolating tube is disposed within a gas turbine engine.

6 Claims, 8 Drawing Sheets

(51) Int. Cl.
*F01D 25/14* (2006.01)
*F01D 25/28* (2006.01)
*F02K 1/80* (2006.01)
*F16L 51/03* (2006.01)
*B22F 3/105* (2006.01)

(56) References Cited

U.S. PATENT DOCUMENTS

| | | | | |
|---|---|---|---|---|
| 3,259,405 A | * | 7/1966 | Heller | F16L 51/025 |
| | | | | 285/226 |
| 3,725,565 A | | 4/1973 | Schmidt | |
| 3,809,128 A | * | 5/1974 | Tateisi | F16L 11/20 |
| | | | | 138/114 |
| 3,837,685 A | | 9/1974 | Miller | |
| 4,064,355 A | * | 12/1977 | Neroni | A47L 9/24 |
| | | | | 174/47 |
| 4,239,267 A | | 12/1980 | Hudson | |
| 4,432,395 A | * | 2/1984 | Beune | F16L 47/10 |
| | | | | 138/109 |
| 4,644,780 A | * | 2/1987 | Jeter | F16L 55/005 |
| | | | | 138/104 |
| 5,305,799 A | * | 4/1994 | Dal Palu | F16L 11/11 |
| | | | | 138/109 |
| 5,678,610 A | * | 10/1997 | Scarazzo | B29C 33/123 |
| | | | | 138/109 |
| 5,704,401 A | * | 1/1998 | Fukui | F16L 11/11 |
| | | | | 138/121 |
| 7,498,698 B2 | | 3/2009 | Yamaguchi | |
| 9,353,687 B1 | * | 5/2016 | Brostmeyer | F02C 7/16 |
| 9,644,495 B2 | | 5/2017 | Zurmehly et al. | |
| 2003/0094208 A1 | | 5/2003 | Gabriel et al. | |
| 2006/0061092 A1 | | 3/2006 | Keyes | |
| 2012/0091144 A1 | | 4/2012 | Baumgartner et al. | |
| 2015/0047935 A1 | | 2/2015 | Godfrey et al. | |
| 2015/0052872 A1 | * | 2/2015 | Zurmehly | F01D 25/125 |
| | | | | 60/39.08 |
| 2016/0138737 A1 | * | 5/2016 | Hariram | B23P 19/00 |
| | | | | 138/121 |
| 2017/0009604 A1 | | 1/2017 | Morris et al. | |

* cited by examiner

FLEXIBLE, THERMAL-ISOLATING, DUAL-WALLED TUBE WITH BELLOWS AND METHOD FOR MANUFACTURE THEREOF

TECHNICAL FIELD

The present disclosure generally relates to gas turbine engines, and more particularly relates to flexible, thermal-isolating, dual-walled tubes with bellows for use gas turbine engines, and methods of manufacturing such tubes particularly using additive manufacturing processes.

BACKGROUND

Gas turbine engines may employ a variety of tubing assemblies. In one example, compressor air is often bled from the main core flow and routed through air transfer tubes to buffer sump cavities or to provide critical turbine airfoil cooling or turbine disk cavity purging. In another example, tubes are used in connection with bearing sumps to supply oil to the bearing sump, to drain spent oil from the bearing sump, to pressurize the bearing sump with air, and to vent air from the bearing sump. Other exemplary tube uses in gas turbine engines are widely known to those of ordinary skill in the art.

Tubes used in gas turbine engines in the past may suffer from various shortcomings. In the example of a tube carrying air, the routing of the air requires that the inlets and exits of the transfer tubes be capable of significant relative motion (due to thermal expansion, vibration, or mechanical loads for example) which adds complexity to the design since multiple O-ring seals, piston seals, gasket seals, and associated mating bosses are required. In the example of a tube carrying oil, coke may form in the tubes due to muting the tubes through hot airfoils. Moreover, for any tube implemented in a gas turbine engine, stresses often concentrate at the junction of the thin walled tubes and the welded/brazed thick bosses or bends, which can result in thermomechanical fatigue failure at the stress concentrations in the assembly at the weak weld/braze joints and interfaces.

Accordingly, it is desirable to provide gas turbine engine service tubes and assemblies thereof that overcome one or more of the foregoing shortcomings. Furthermore, other desirable features and characteristics of the present disclosure according to exemplary embodiments will become apparent from the subsequent detailed description and the appended claims, taken in conjunction with the accompanying drawings and the preceding background.

BRIEF SUMMARY

In one exemplary embodiments, disclosed herein is a flexible, thermal-isolating tube, including a first fluid flow channel portion having a dual-walled configuration, a second fluid flow channel portion having a dual-walled configuration, and a bellows disposed between and coupled to each of the first and second fluid flow channel portions. The flexible, thermal-isolating tube, including each of the first and second fluid flow channel portions, and the bellows, is configured as a unitary structure.

In variations of this embodiment, the flexible, thermal-isolating tube is manufactured using an additive manufacturing process. In further variations of this embodiment, the flexible, thermal-isolating tube is disposed within a gas turbine engine.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses of the disclosure. As used herein, the word "exemplary" means "serving as an example, instance, or illustration." Thus, any embodiment described herein as "exemplary" is not necessarily to be construed as preferred or advantageous over other embodiments. All embodiments described herein are exemplary embodiments provided to enable persons skilled in the art to make or use the disclosure and not to limit the scope of the invention which is defined by the claims. Furthermore, there is no intention to be bound by any expressed or implied theory presented in the preceding technical field, background, brief summary, or the following detailed description.

Various embodiments are directed to flexible, thermal-isolating, dual-walled tubes with bellow for use gas turbine engines, and methods of manufacturing such tubes particularly using additive manufacturing processes. The flexible, thermal-isolating, dual-walled tubes, and assemblies thereof, allow adequate thermal growth and stress compliance during transient and steady state operating conditions. The terms "compliant," "compliance," and "flexible" as used herein refer to the ability of the tube to absorb and attenuate relative motions to eliminate concentrated stress, thereby minimizing the negative effects of thermo-mechanical fatigue (TMF) during gas turbine engine operation. The flexible, thermal-isolating, dual-walled tubes comprise a unitary structure. As used herein, the term "unitary" means a one-piece configuration such that the unitary structure excludes brazing, fasteners, or the like for maintaining parts in a fixed relationship as a single unit. The term "thermal isolating" refers to substantial thermal isolation between a fluid adapted to flow within an inner tubular member of the tube and a medium externally adjacent to the tube. As a result of the tube being "thermal isolating," heat loads and coking of the thermal-isolating tube are reduced, resulting in reduced bearing and engine maintenance, increased bearing and engine life, reduced heat rejection requirements, and reduced engine overhaul and removals. In addition, the tubes for gas turbine engines in accordance with exemplary embodiments are more easily routed within the stationary structural frame of the gas turbine engine.

Figure 1:
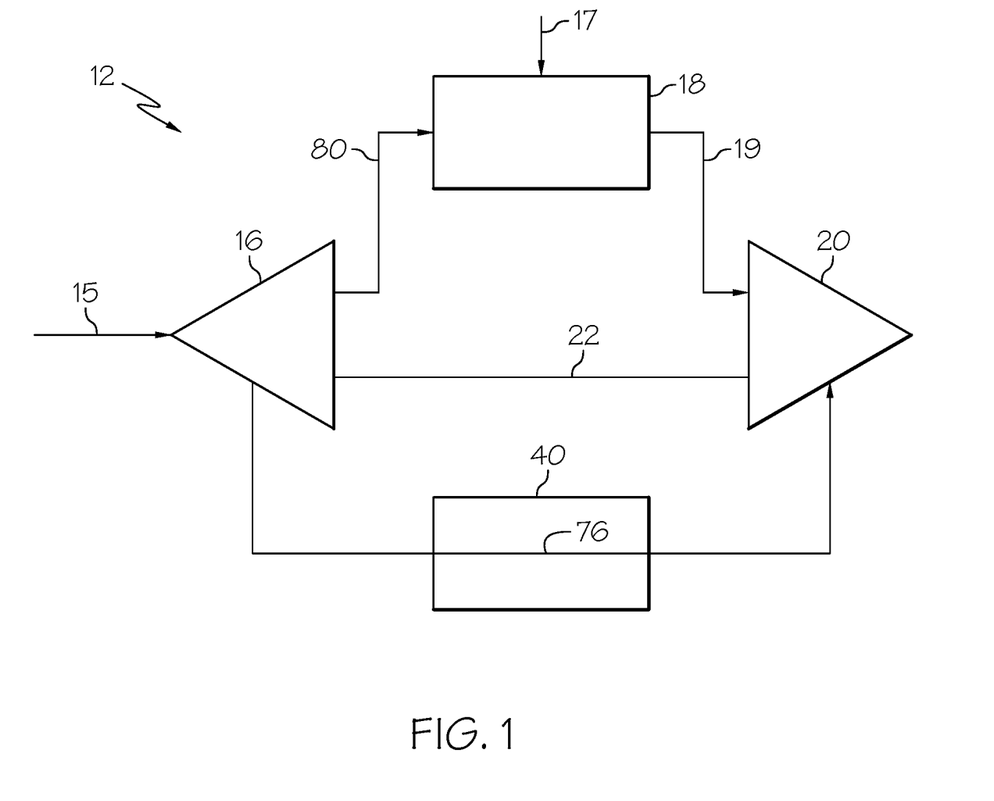
FIG. 1 is a simplified schematic illustration of a gas turbine engine.

FIG. 1 is a simplified schematic illustration of a gas turbine engine 12 including a compressor 16, a combustor 18, and a turbine 20. The compressor 16, combustor 18, and turbine 20 are in flow communication. Compressor 16 and turbine 20 are coupled by a shaft 22. Shaft 22 rotates about an axis of symmetry, which is the centerline of the shaft 22. In operation, air 15 flows through the compressor 16 and compressed inlet air 80 is supplied from compressor 16 to combustor 18 and is then mixed with fuel 17 provided by fuel nozzles (not shown) and ignited within the combustor 18 to produce hot combustion gases 19. The hot combustion gases 19 drive turbine 20. Intermediate pressure cooling air 76 flows from the compressor 16 to the turbine 20 through a cooling circuit 40 to cool the turbine components. It is to be understood that only one compressor and one turbine are shown for ease of illustration, but multiple compressors and turbines may be present in the gas turbine engine. As initially noted above, the flexible, thermal-isolating, dual-walled tubes of the present disclosure may be implemented generally as any tubing application of a gas turbine engine, such as, but not limited to, compressor bleed air transfer and bearing oil transfer.

Figure 2:
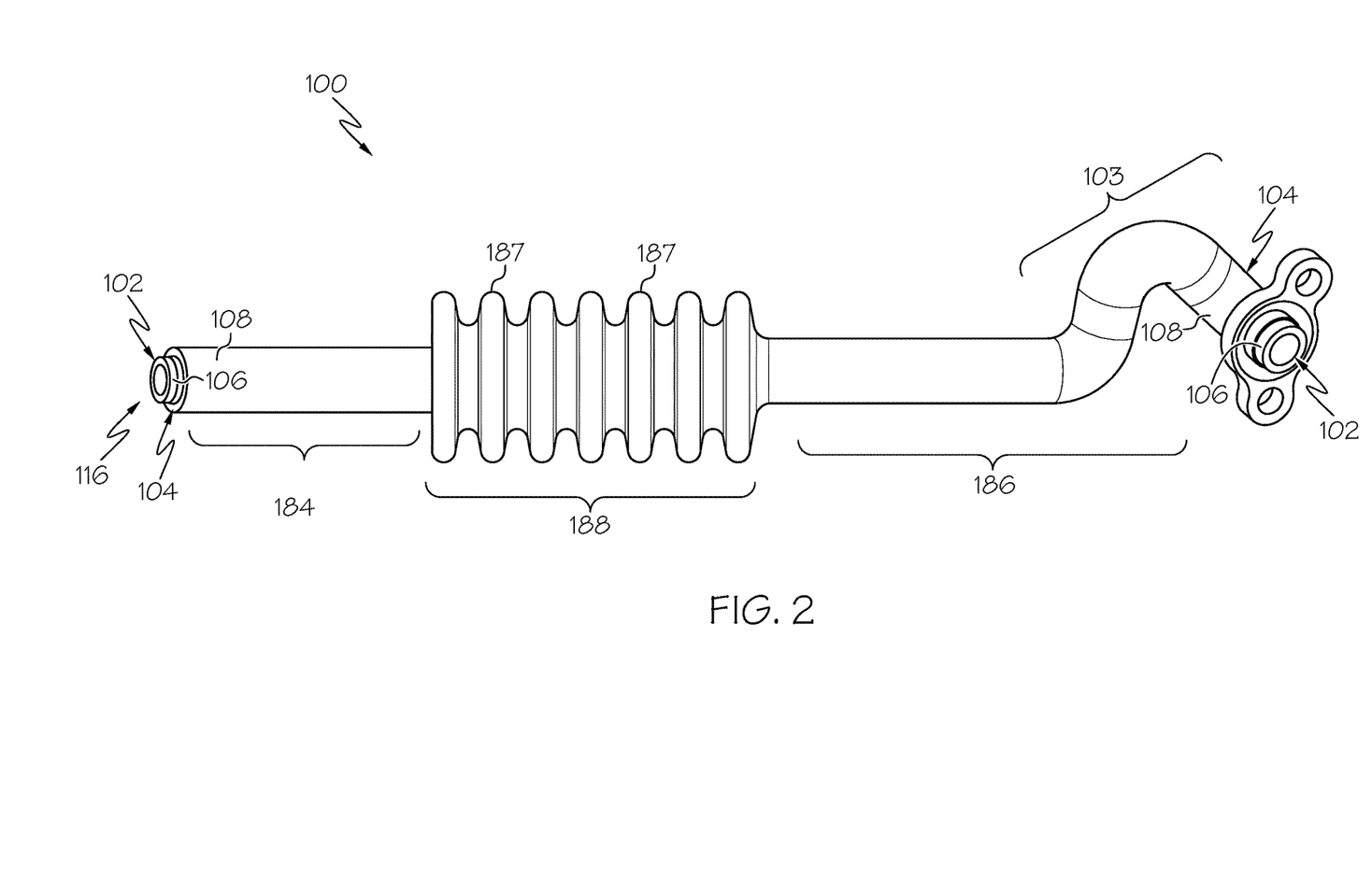
FIG. 2 is an isometric view of an exemplary flexible, thermal-isolating, dual-walled tube with bellows 100, according to an exemplary embodiment.

FIG. 2 is an isometric view of an exemplary flexible, thermal-isolating, dual-walled tube with bellows 100, according to an exemplary embodiment, which is provided initially to illustrate certain general features thereof. For instance, the thermal-isolating feature of the tube 100 may derive, at least in part, from its dual-walled construction. In this regard, tube 100 includes a plurality of tubular members disposed around each other. Each of the tubular members is hollow. The plurality of tubular members may be substantially concentric, partially eccentric, fully eccentric, or combinations thereof. The plurality of tubular members includes an inner tubular member 102 defining a fluid passage and an outer tubular member 104 disposed about the inner tubular member 102. The inner tubular member 102 has an inner tubular member wall 106 and the outer tubular member 104 has an outer tubular member wall 108. A spacing volume is defined between the inner tubular member wall 106 and the adjacent outer tubular member wall 108. While the exemplary illustrated tube 100 of FIG. 2 has only two tubular members (the inner tubular member 102 and the outer tubular member 104), it is to be understood that the tube 100 may have more than two tubular members.

As a further general feature, the exemplary flexible, thermal-isolating, dual-walled tube with bellows 100, in some embodiments, may include a unitary structure having at least one portion with a curved configuration, a non-circular cross-sectional shape, or both (or neither). The inner tubular member 102 may have a cross-sectional shape that is the same as the cross-sectional shape of the outer tubular member 104. In other embodiments, the cross-sectional shape of the inner tubular member 102 may be different from the cross-sectional shape of the outer tubular member 104. The cross-sectional shape of the outer tubular members may be the different or the same from each other. The curved configuration may include a uniform curved configuration or a non-uniform curved configuration. For example, as generally indicated at 103, tube 100 have a non-uniform curved configuration, that is, the tube 100 may curve in a number of directions. The non-circular cross-sectional shape may be any cross-sectional shape, such as circular, arcuate, or any other cross-sectional shape that is not circular. The tube 100 may have a portion with a non-circular cross-sectional shape and an adjacent portion with a circular cross-sectional shape. Alternatively, the tube 100 may have a portion with the non-circular cross-sectional shape and an adjacent portion with a different non-circular cross-sectional shape. The tube 100 may change cross-sectional shape from substantially concentric circular cross-sectional shapes to non-circular, eccentric cross-sectional shapes.

As a further general feature, the exemplary flexible, thermal-isolating, dual-walled tube with bellows 100, in some embodiments, may include a unitary structure having a cylindrical end portion 116 configured for connection with a common fitting such as a coupling member (not shown). Furthermore, the tube 100 may include a unitary structure having an end portion terminating in a mounting flange 118. The tube 100 may be configured to be attached to a mounting surface by the mounting flange. The tube 100 may terminate in any combination of cylindrical end portions and/or mounting flanges. Other end portion shapes/configuration may alternatively be employed in order to couple the tube 100 with an appropriate attachment point.

As a further general feature, the exemplary flexible, thermal-isolating, dual-walled tube with bellows 100, in some embodiments, may include a first fluid flow channel portion 184, a second fluid flow channel portion 186, and a bellows portion 188 disposed between the first fluid flow channel portion 184 and the second fluid flow channel portion 186. Curved configurations may generally be present in either or both portions 184, 186, or both portions 184, 186 may each be substantially straight. Portions 184, 186 may each individually terminate in any manner, such as cylindrical end portion 116, mounting flange 118, or other terminus. Portions 184, 186 may each individually include any combination of cross-sectional shapes and/or sizes. The bellows portion 188 may have convolutes 187 in a variety of shapes, such as rounded, squared, cotter-pin shaped, and square/rectangular, among others. Any number of convolutes may be present, in an embodiment. Any or multiple curvature angles of convolutes may be present, in an embodiment. Any or multiple convolute pitches may be present, in an embodiment. Any or multiple wall thicknesses may be present, in an embodiment. Further, in some embodiments, additional fluid flow channel portions may be present between which may be disposed additional bellows.

FIGS. 3A-B, 4A-B, 5A-B, 6A-B, and 7A-B illustrate specific features of individual embodiments of the present disclosure, in particular with regard to the integration of the bellows 188 into the dual-walled configuration (102/104). That being said, in each illustration, although the first and second fluid flow channel portions 184, 186 are illustrated as straight, cylindrical, and concentric for ease of illustration, variations of the illustrated embodiments may include any configuration of portions 184, 186 as described above. Moreover, in each illustration, although portions 184, 186 terminate with cylindrical end portions 116 for ease of illustration, variations of the illustrated embodiments may include any end portion/flange as described above. Still further, in each illustration, although bellows 188 is shown with a single curvature, pitch, length, thickness, and width, variations of the illustrated embodiments may include any configuration of bellows as described above. As will be described in greater detail below, additive manufacturing techniques may be used to manufacture any of the tubes 100 shown in these figures. Accordingly, the tubes 100 may be configured with one or more external holes 195 for powder removal purposes.

Figure 3A:
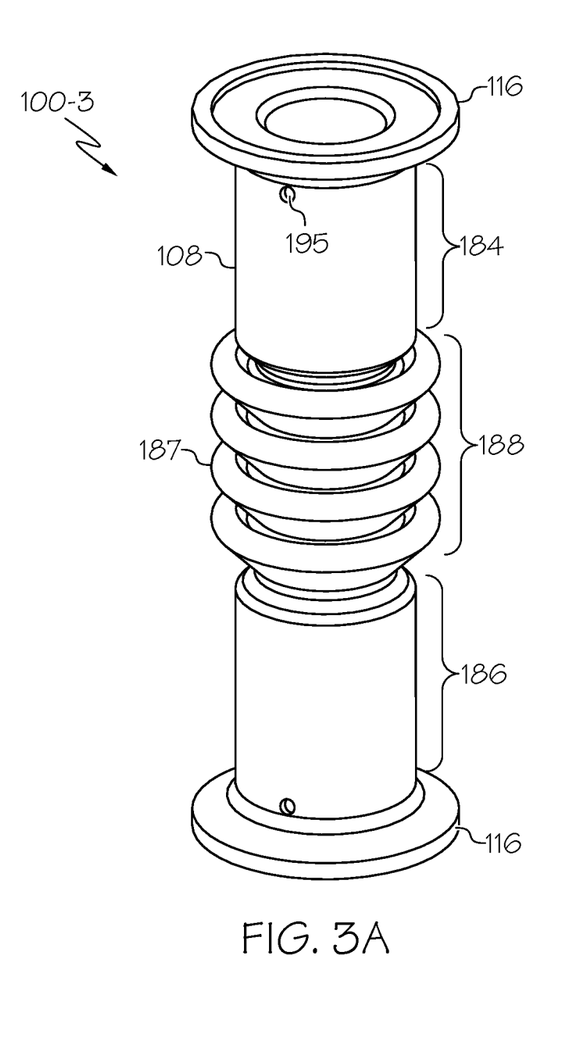
FIGS. 3A-B, 4A-B, 5A-B, 6A-B, and 7A-B, respectively (with the A-view being isometric and the B-view being cross-sectional), illustrate specific features of individual tube embodiments of the present disclosure, in particular with regard to the integration of the bellows into the dual-walled configuration.
Figure 3B:
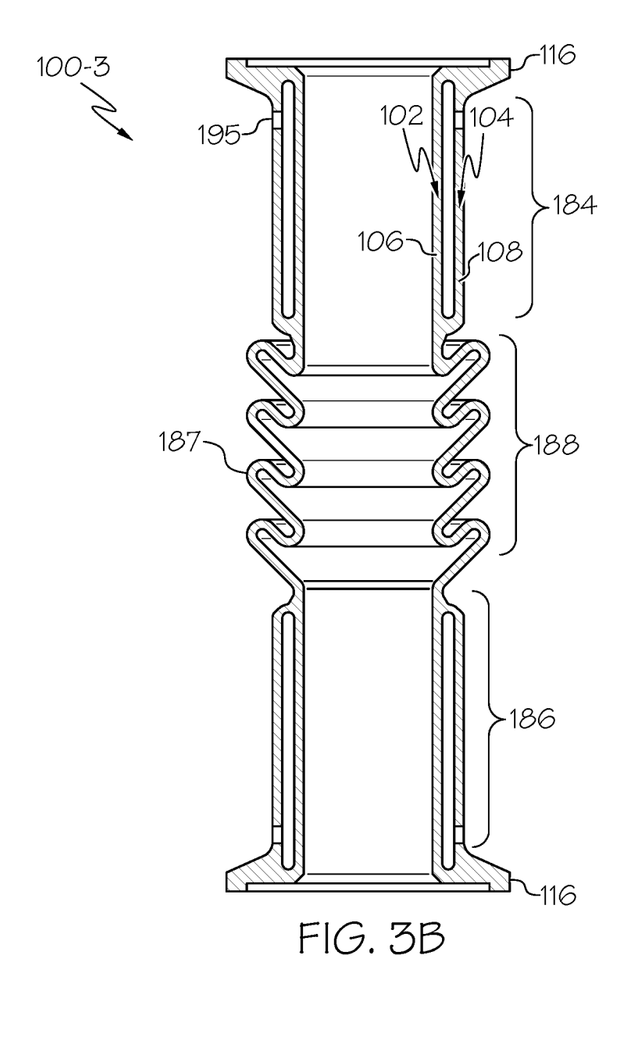

Turning first to FIGS. 3A-B, in accordance with one embodiment is illustrated an exemplary flexible, thermal-isolating tube 100-3. As shown, the dual-walled configuration (102/104) is contained entirely within the respective fluid flow channel portions 184, 186. Stated alternatively, the dual-walled configuration (102/104) ends that the respective end portions 116, and at each end of the bellows 188. The inner tubular member 102 merges smoothly into the bellows 188 wall at its connection point to each portion 184, 186, and the outer tubular member 104 merges smoothly into the inner tubular member 102 prior to the bellows 188. The respective end portions 116 flare radially outwardly from the outer tubular member 104 at each respective channel portion 184, 186.

Figure 4A:
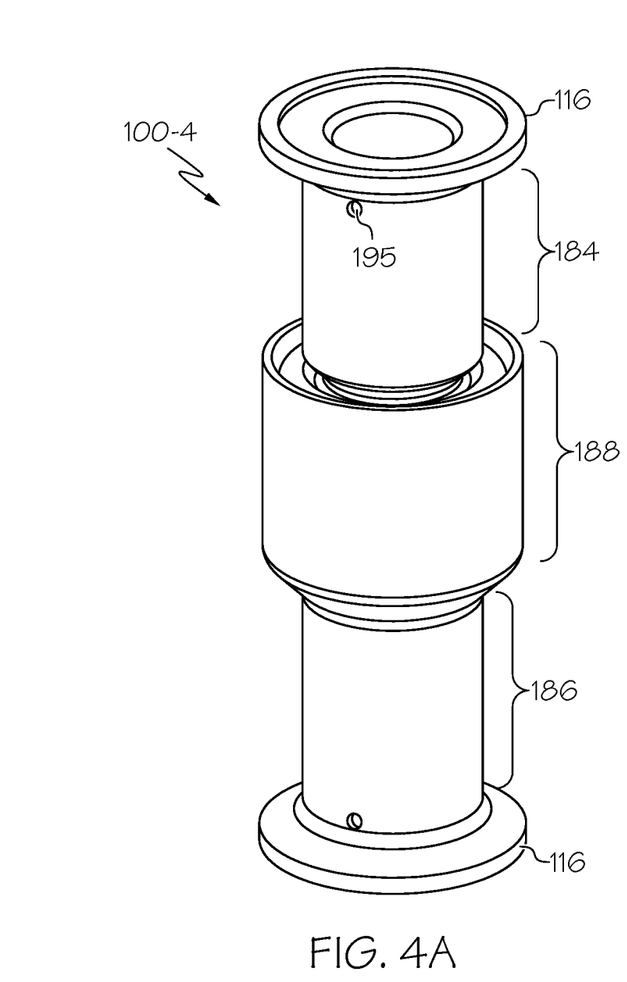
Figure 4B:
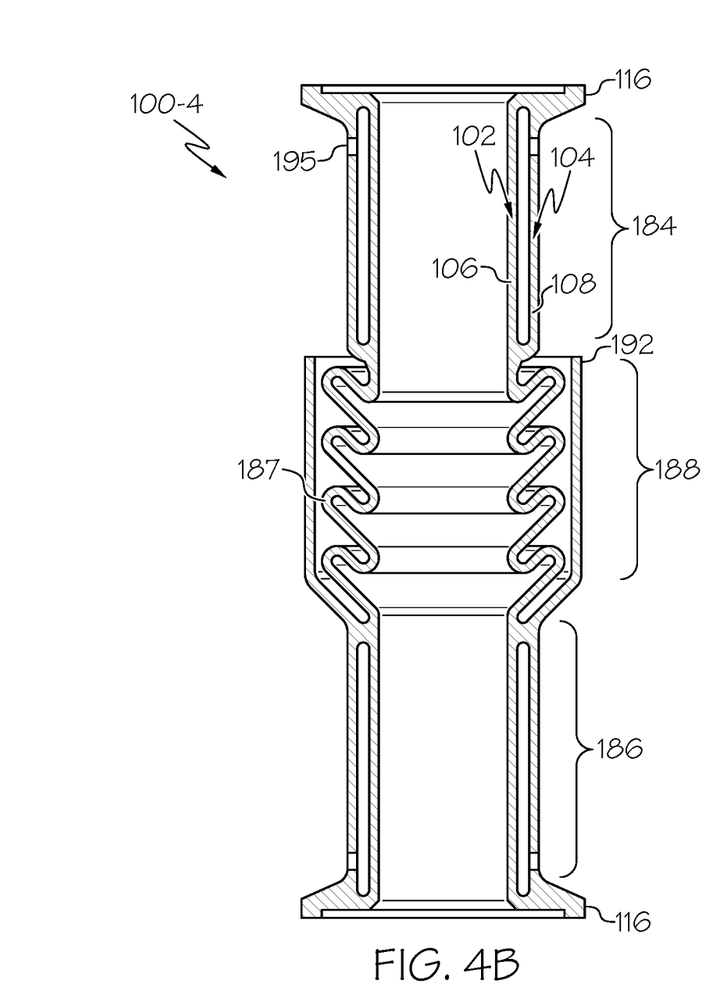

Turning next to FIGS. 4A-B, in accordance with one embodiment is illustrated an exemplary flexible, thermal-isolating tube 100-4. As shown, tube 100-4 differs from tube 100-3 in that the dual-walled configuration is extended such that the bellows 188 is circumferentially surrounded by a heat shield member 192, which may be generally cylindrical in configuration. At channel portion 186, as opposed to the outer tubular member 104 merging into the inner tubular member 102 as in tube 100-3, the outer tubular member 104 of tube 100-4 instead diverges radially outwardly so as to surround the convolutes 187 of the bellows 188 without actually touching any of the convolutes 187. Reaching the end of the bellows 188 at the channel portion 184, the heat shield member 192 may terminate by merging into the outer tubular member 104 of channel portion 184, either smoothly or otherwise.

Figure 5A:
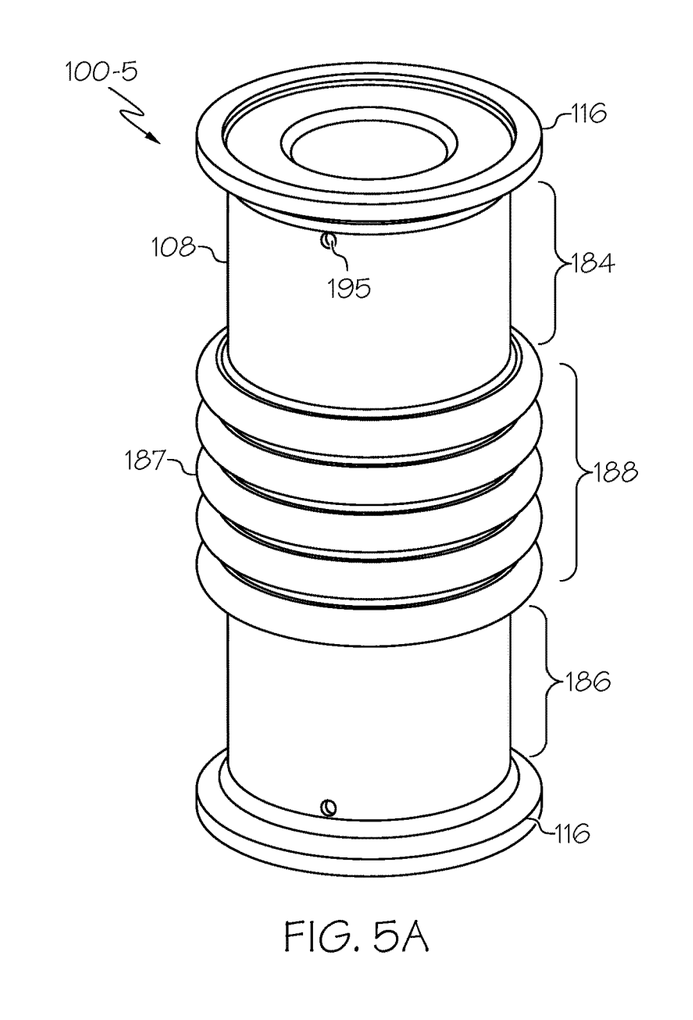
Figure 5B:
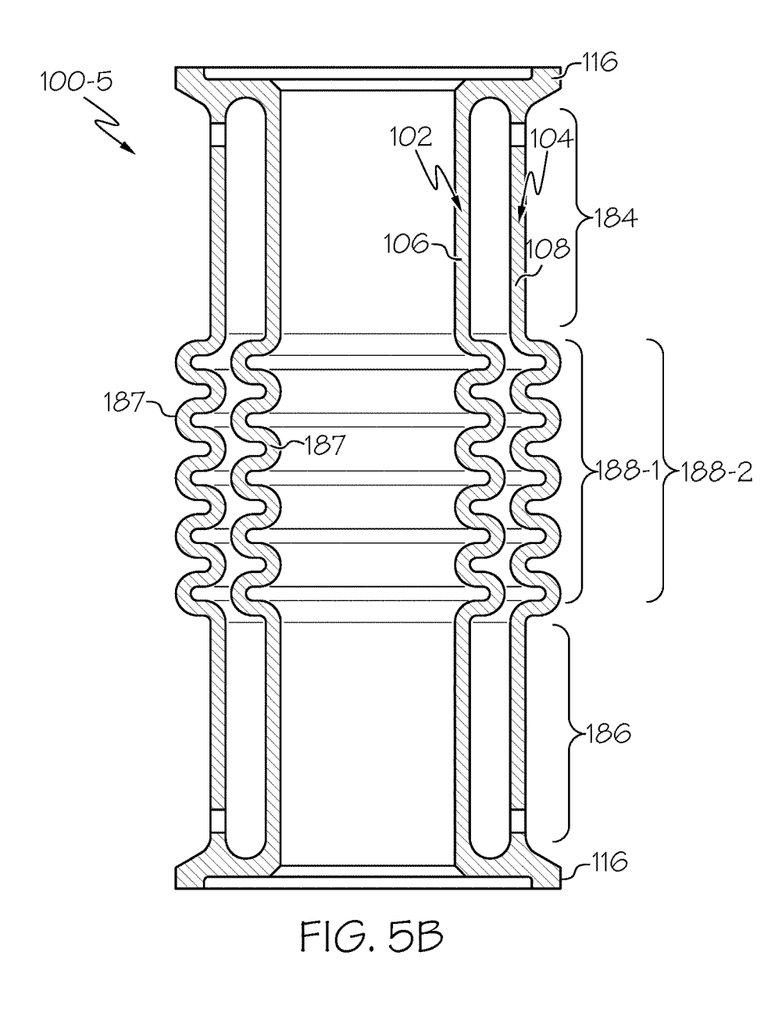

Turning next to FIGS. 5A-B, in accordance with one embodiment is illustrated an exemplary flexible, thermal-isolating tube 100-5. As shown, tube 100-5 differs from tube 100-3 in that the dual-walled configuration is extended such that there are two concentric bellows 188-1, 188-2, with outer bellows 188-2 circumferentially surrounding inner bellows 188-1. At channel portion 186, as opposed to the outer tubular member 104 merging into the inner tubular member 102 as in tube 100-3, the outer tubular member 104 of tube 100-4 instead diverges radially outwardly so as to form outer bellows 188-2 and surround the convolutes 187 of the inner bellows 188-1 without actually touching any of the convolutes 187 of inner bellows 188-1. Reaching the end of the inner bellows 188-1 at the channel portion 184, the outer bellows 188-2 may terminate by smoothly merging into the outer tubular member 104 of channel portion 184.

Figure 6A:
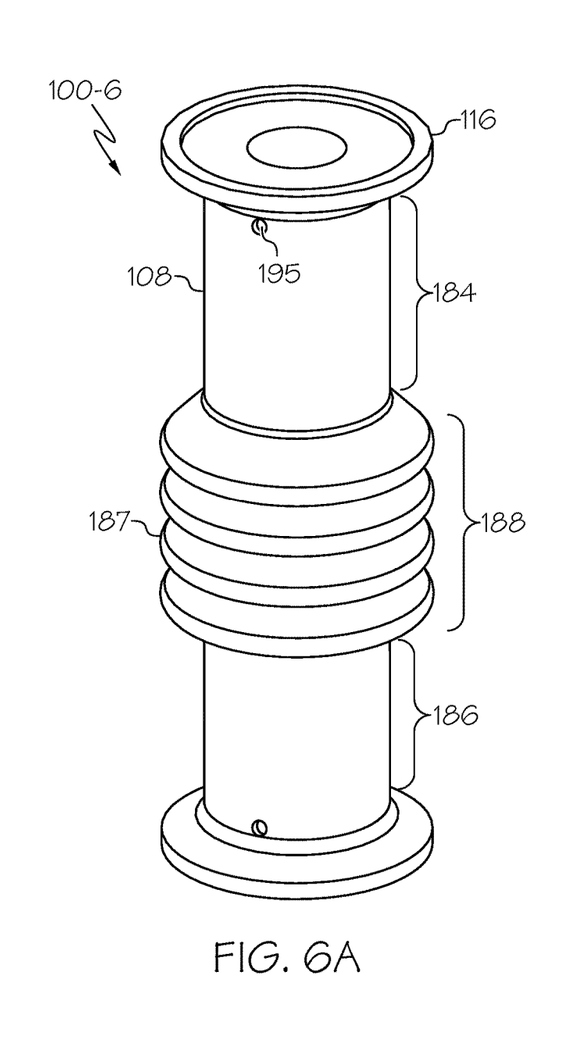
Figure 6B:
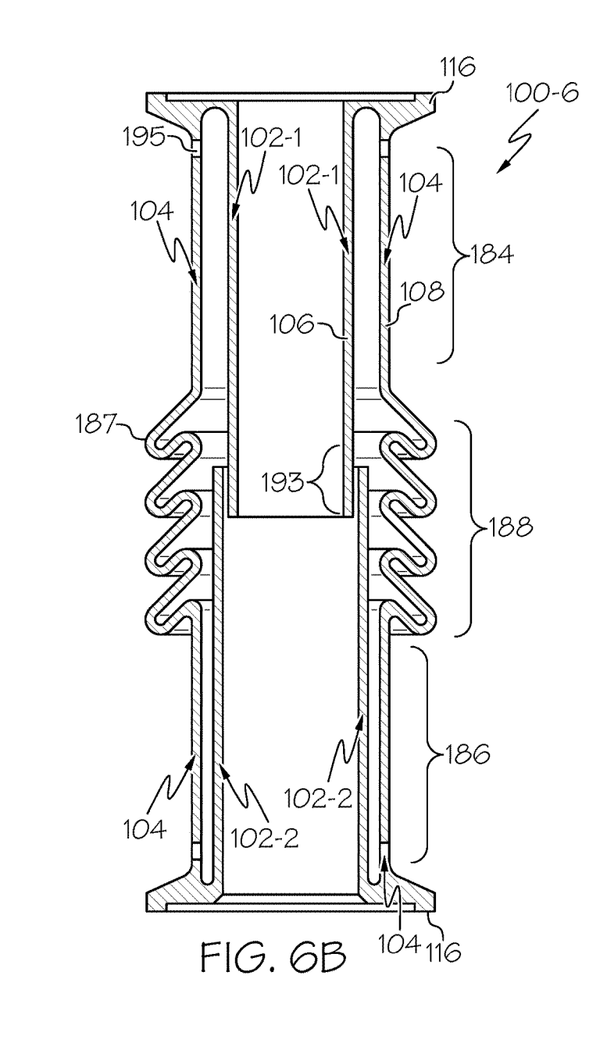

Turning next to FIGS. 6A-B, in accordance with one embodiment is illustrated an exemplary flexible, thermal-isolating tube 100-6. As shown, tube 100-6 differs from tube 100-3 in that it is the outer tubular member 104, not the inner tubular member 102, that merges smoothly into the bellows 188. Instead, the inner tubular member 102-2 of the channel portion 186 extends straight within the bellows 188 such that the bellows 188 circumferentially surrounds the bellows 188 without touching it, and the inner tubular member 102-1 of the channel portion 184 extends straight within both the inner tubular member 102-2 and the bellows 188. As such, the radial spacing between the inner tubular member 102-2 and the outer tubular member 104 at channel portion 186 is less than the radial spacing between the inner tubular member 102-1 and the outer tubular member 104 at channel portion 184. There is some overlap 193 between inner tubular members 102-1, 102-2 within the bellows 188 to ensure smooth fluid flow therein. As such, overlap 193 forms a "slip fit" between the respective inner tubular members 102-1, 102-2.

Figure 7A:
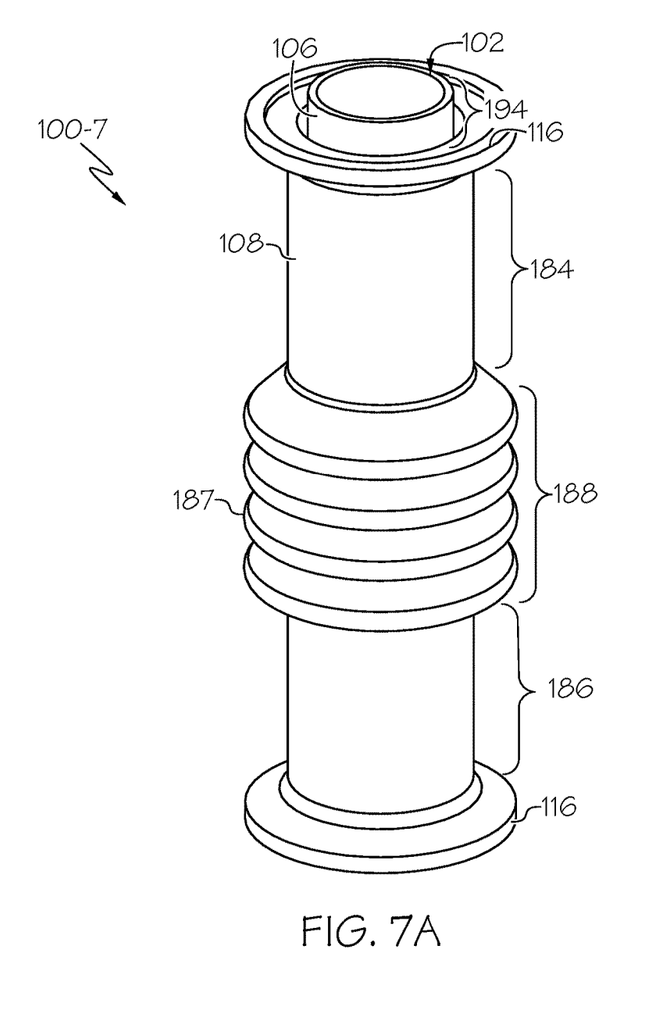
Figure 7B:
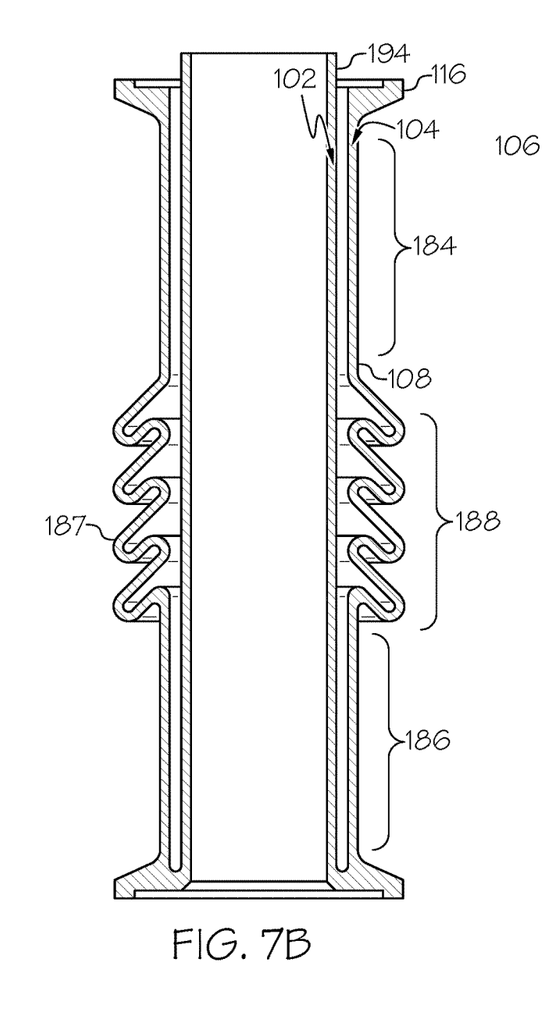

Still further, turning to FIGS. 7A-B, in accordance with one embodiment is illustrated an exemplary flexible, thermal-isolating tube 100-7. As shown, tube 100-7 differs from tube 100-6 in that the inner tubular member 102 continues straight through both channel portions 184, 186, and bellows 188, without any slip fit. That is, inner tubular member 102 is itself an integral structure. As such, there is no difference in radial spacing between the inner/outer tubular members 102/104 of channel portion 184 and the inner/outer tubular member s 102/104 of channel portion 186. Thus, the inner tubular member 102 maintains a substantially constant diameter along its length within each of the channel portions 184, 186 and the bellows 188. Further, in some embodiments, the inner tubular member 102 may extend a distance 194 passed the cylindrical end portion 116 of channel portion 184. Also, the need for powder removal holes 195 may be removed in this embodiment.

It will be appreciated that the presently described tubes 100 would be expensive or impossible to manufacture using conventional manufacturing techniques. As such, designs in accordance with the present disclosure are not known in the prior art. However, the present inventors have discovered that using additive manufacturing techniques, or other recently developed manufacturing techniques, designs in accordance with the present disclosure can be manufactured at a significantly reduced cost as compared to traditional manufacturing techniques. Additive manufacturing techniques include, for example, direct metal laser sintering (DMLS—a form of direct metal laser fusion (DMLF)) with nickel base super-alloys, low density titanium, and aluminum alloys. DMLS is discussed in greater detail below. Another technique includes electron beam melting (EBM) with titanium, titanium aluminide, and nickel base super-alloy materials. Still further, casting or metal injection molding (MIM) may be employed.

The exemplary flexible, thermal-isolating, dual-walled tubes with bellows 100 may be manufactured using additive manufacturing techniques. Additive manufacturing techniques may begin with providing a model, such as a design model, of the tube 100. The model may be defined in any suitable manner. For example, the model may be designed with computer aided design (CAD) software and may include three-dimensional ("3D") numeric coordinates of the entire configuration of the tubes including both external and internal surfaces. In one exemplary embodiment, the model may include a number of successive two-dimensional ("2D") cross-sectional slices that together form the 3D component.

The tube 100 is formed according to the model, using a rapid prototyping or additive layer manufacturing process. Some examples of additive layer manufacturing processes include: micro-pen deposition in which liquid media is dispensed with precision at the pen tip and then cured; selective laser sintering in which a laser is used to sinter a powder media in precisely controlled locations; laser wire deposition in which a wire feedstock is melted by a laser and then deposited and solidified in precise locations to build the product; electron beam melting; laser engineered net shaping; and direct metal deposition. In general, additive manufacturing techniques provide flexibility in free-form fabrication with few or no geometric constraints, fast material processing time, and innovative joining techniques. In one particular exemplary embodiment, direct metal laser fusion (DMLF) may be used to produce the multi-walled unitary tube. DMLF is a commercially available laser-based rapid prototyping and tooling process by which complex parts may be directly produced by precision melting and solidification of metal powder into successive layers of larger structures, each layer corresponding to a cross-sectional layer of the 3D component. DMLF may include direct metal laser sintering (DMLS), as previously noted.

Figure 8:
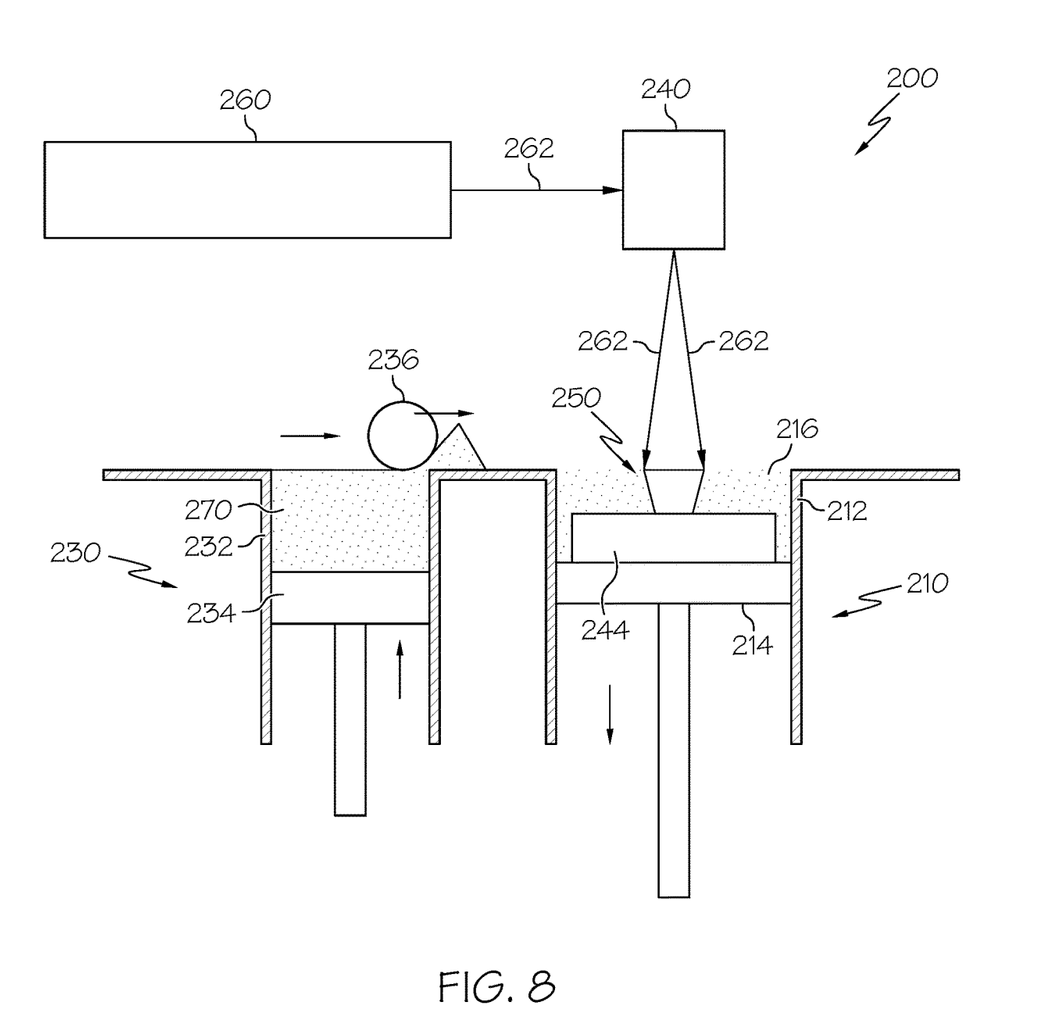
FIG. 8 is a schematic view of an exemplary direct metal laser fusion (DMLF) system for manufacturing the exemplary tubes according to an embodiment.

FIG. 8 is a schematic view of an exemplary DMLF system 200 for manufacturing the tube 100 (for example as exemplified in FIGS. 3A-7B) in accordance with an exemplary embodiment. The system 200 includes a fabrication device 210, a powder delivery device 230, a scanner 240, and a laser 260 that function to manufacture the article 250 (e.g., the tube 100) with build material 270. The fabrication device 210 includes a build container 212 with a fabrication support 214 on which the article 250 is formed and supported. The fabrication support 214 is movable within the build container 212 in a vertical direction and is adjusted in such a way to define a working plane 216. The delivery device 230 includes a powder chamber 232 with a delivery support 234 that supports the build material 270 and is also movable in the vertical direction. The delivery device 230 further includes a roller or wiper 236 that transfers build material 270 from the delivery device 230 to the fabrication device 210.

During operation, a base block 244 may be installed on the fabrication support 214. The fabrication support 214 is lowered and the delivery support 234 is raised. The roller or wiper 236 scrapes or otherwise pushes a portion of the build material 270 from the delivery device 230 to form the working plane 216 in the fabrication device 210. The laser 260 emits a laser beam 262, which is directed by the scanner 240 onto the build material 270 in the working plane 216 to selectively fuse the build material 270 into a cross-sectional layer of the article 250 according to the design. More specifically, the speed, position, and other operating parameters of the laser beam 262 are controlled to selectively fuse the powder of the build material 270 into larger structures by rapidly melting the powder particles that may melt or diffuse into the solid structure below, and subsequently, cool and re-solidify. As such, based on the control of the laser beam 262, each layer of build material 270 may include unfused and fused build material 270 that respectively corresponds to the cross-sectional passages and walls that form the article 250. In general, the laser beam 262 is relatively low power to selectively fuse the individual layer of build material 270. As an example, the laser beam 262 may have a power of approximately 50 to 500 Watts, although any suitable power may be provided.

Upon completion of each layer, the fabrication support 214 is lowered and the delivery support 234 is raised. Typically, the fabrication support 214, and thus the article 250, does not move in a horizontal plane during this step. The roller or wiper 236 again pushes a portion of the build material 270 from the delivery device 230 to form an additional layer of build material 270 on the working plane 216 of the fabrication device 210. The laser beam 262 is movably supported relative to the article 250 and is again controlled to selectively form another cross-sectional layer. As such, the article 250 is positioned in a bed of build material 270 as the successive layers are formed such that the unfused and fused material supports subsequent layers. This process is continued according to the modeled design as successive cross-sectional layers are formed into the completed tube 100.

As a general matter, the build material 270 may be formed by any suitable powder, including powdered metals, such as a stainless steel powder, and alloys and super alloy materials, such as nickel-based or cobalt super-alloys. In one exemplary embodiment, the build material 270 is a high temperature nickel base super alloy such as IN718. In other embodiments, MAR-M-247, IN738, titanium, aluminum, titanium-aluminide, or other suitable alloys may be employed. In general, the powder build material 270 may be selected for enhanced strength, durability, and useful life, particularly at high temperatures, although as described below, the powder build material 270 may also be selected based on the intended function of the area being formed.

When the tube 100 is complete, it is removed from the additive manufacturing system (e.g., from the DMLF system 200). The completed tube 100 may undergo finishing treatments. Finishing treatments may include, for example, aging, annealing, quenching, peening, polishing, hot isostatic pressing (HIP), or coatings. For example, during a HIP process, an encapsulation layer is applied to the article and pressure and heat are applied to remove or reduce any porosity and cracks internal to or on the surface of the component, as described in U.S. patent application Ser. No. 12/820,652, titled "METHODS FOR MANUFACTURING TURBINE COMPONENTS," filed Jun. 22, 2010, and published as United States Patent Application Publication No. 2011/0311389, on Dec. 22, 2011, the contents of which are herein incorporated by reference in their entirety. The encapsulation layer functions to effectively convert any surface porosity and cracks into internal porosity and cracks, and after the application of pressure and heat, removes or reduces the porosity and cracks. Such encapsulation layers may be subsequently removed or maintained to function as an oxidation protection layer.

If necessary, the tube 100 may be machined to final specifications. At this point, the as referred to herein regarding additive manufacturing techniques corresponds with the finished tube 100 shown in the figures. In further steps (not shown), the tube 100 may be tested and installed in a gas turbine engine, such as shown in FIG. 1. While tube 100 has been described for use in a gas turbine engine, it is to be understood that the tube 100 according to exemplary embodiments may be used with systems in other than gas turbine engines when thermal isolation/improved compliance is desired between fluid adapted to flow in the inner tubular member and the medium externally adjacent to the tube 100 and/or external structure and/or when there are tube routing/installation challenges.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A flexible, thermal-isolating tube, comprising:
   a first fluid flow channel portion having a dual-walled configuration;
   a second fluid flow channel portion having a dual-walled configuration; and
   a bellows disposed between and adjacent to each of the first and second fluid flow channel portions,
   wherein the flexible, thermal-isolating tube, including each of the first and second fluid flow channel portions, and the bellows, is configured as a unitary metallic structure comprising a one-piece configuration such that the unitary structure excludes brazing, fasteners, or fastening means for maintaining parts in a fixed relationship as a single unit,
   wherein the bellows forms a section of a single-walled configuration between the first and second fluid flow channel portions and extends from an inner wall of the dual-walled configuration of both the first and second fluid flow channels portions.

2. The flexible, thermal-isolating tube of claim 1, wherein the first and second fluid flow channels each independently comprise an end portion chosen from: a cylindrical end portion or a flange end portion.

3. The flexible, thermal-isolating tube of claim 1, wherein either or both of the first and second fluid flow channels comprise a curved configuration.

4. The flexible, thermal-isolating tube of claim 1, configured for carrying oil from a first location to a second location.

5. The flexible, thermal-isolating tube of claim 1, configured for carrying compressor air from a first location to a second location.

6. The flexible, thermal-isolating tube of claim 1, comprising a metal super-alloy material.

* * * * *